United States Patent
Kim

(10) Patent No.: US 9,368,127 B2
(45) Date of Patent: Jun. 14, 2016

(54) METHOD AND DEVICE FOR PROVIDING DISTRIBUTED TELEPRESENCE SERVICE

(71) Applicant: ELECTRONICS AND TELECOMMUNICATIONS RESEARCH INSTITUTE, Daejeon (KR)

(72) Inventor: Hyun-Woo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 146 days.

(21) Appl. No.: 14/186,595

(22) Filed: Feb. 21, 2014

(65) Prior Publication Data

US 2015/0106097 A1   Apr. 16, 2015

(30) Foreign Application Priority Data

Oct. 11, 2013   (KR) .......................... 10-2013-0121515

(51) Int. Cl.
*G10L 17/00* (2013.01)
*G10L 25/57* (2013.01)
*H04N 7/15* (2006.01)
*G10L 25/78* (2013.01)

(52) U.S. Cl.
CPC ................ *G10L 25/57* (2013.01); *H04N 7/152* (2013.01); *G10L 25/78* (2013.01)

(58) Field of Classification Search
CPC ......... H04N 7/15; H04N 7/147; H04N 7/152; H04L 65/1069; H04M 3/567
USPC ........... 704/246; 348/14.07, 14.09, 14.08, 47, 348/14.04, 14.12; 709/218; 379/93.21, 158, 379/202.01
See application file for complete search history.

(56) References Cited

U.S. PATENT DOCUMENTS 8,436,888 B1    5/2013  Baldino et al.
2012/0327174 A1* 12/2012  Hines et al. ................ 348/14.07

OTHER PUBLICATIONS

I. Han et al. "Four-way Video Conferencing and its Session Control Based on Distributed Mini-MCU in Home Server," *Consumer Electronics, 2008. ICCE 2008. Digest of Technical Papers. International Conference on*, Jan. 2008, 2 pages.
H. W. Kim et al., "A Main Speaker Decision for a Distributed Telepresence System," *ICT Convergence (ICTC), 2013 International Conference on*, Oct. 2013, 3 pages.

* cited by examiner

*Primary Examiner* — Charlotte M Baker
(74) *Attorney, Agent, or Firm* — Staas & Halsey LLP

(57) ABSTRACT

There is provided a method of determining a main speaker that is performed by a first terminal participating in a distributed telepresence service. The method of determining a main speaker according to an embodiment of the invention includes obtaining first feature information for determining a main speaker from an audio input signal, obtaining second feature information for determining a main speaker of a second terminal from the second terminal participating in the distributed telepresence service, and determining a main speaker terminal for providing a video and an audio of a main speaker who is participating in a telepresence and is speaking based on the first feature information for determining a main speaker and the second feature information for determining a main speaker.

17 Claims, 6 Drawing Sheets

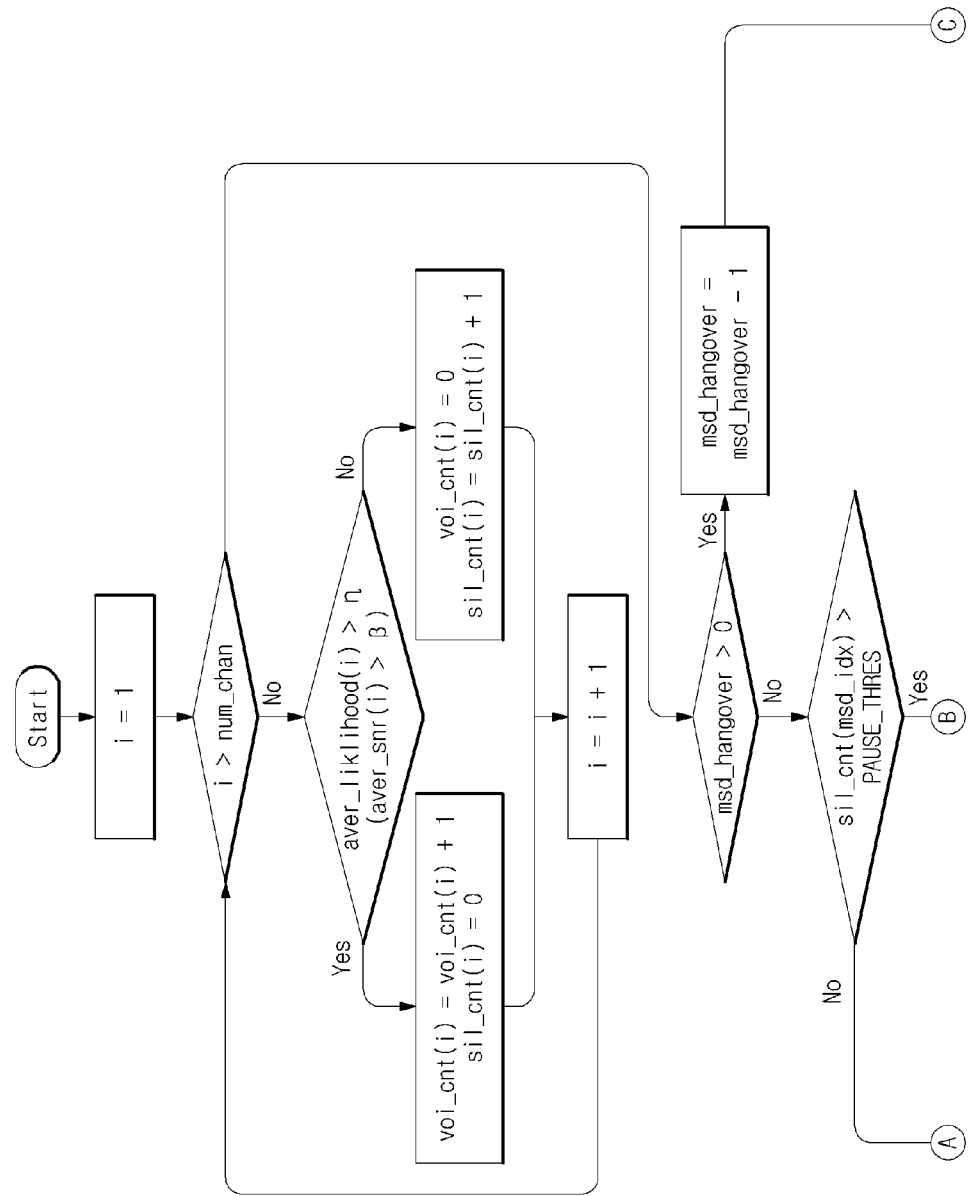

METHOD AND DEVICE FOR PROVIDING DISTRIBUTED TELEPRESENCE SERVICE

CROSS-REFERENCE TO RELATED APPLICATION

This application claims priority to and the benefit of Korean Patent Application No. 2013-0121514, filed on Oct. 11, 2013, the disclosure of which is incorporated herein by reference in its entirety.

BACKGROUND

1. Field of the Invention

The present invention relates to network communication, and more particularly, to a method and device for determining a main speaker in a distributed telepresence service.

2. Discussion of Related Art

The term "telepresence" has various definitions according to viewpoints but generally refers to technology which allows viewers in an environment mediated via a network such as the Internet to similarly feel a virtual environment as a real environment or which provides a cognitive immersion state as equating with reality. Telepresence is frequently applied to a realistic video conference service that supports a high-definition large screen, stereophonic sound, or the like which give viewers the feeling of a real environment.

A goal of a telepresence service is to give a plurality of speakers in remote locations the feeling of being in the same location, unlike existing video conference services. To this end, high-performance visual and auditory devices and emotional technology are used to provide immersion and presence to telepresence participants. In particular, high definition video technology may be a factor which greatly influences a realistic effect capable of being felt by the telepresence participants.

Telepresence systems in the related art have adopted a centralized structure. In a telepresence system with such a centralized structure, a central server processes media (video and sound) packets and call control packets of all user clients. In the centralized structure, although it is possible to easily implement a function, overall traffic is concentrated on a communication node in which the central server is installed. As a result, a maximum service capacity is limited.

In order to address such a problem, a distributed telepresence system in which a media processing function and a call processing function of the central server are distributed and processed over a communication network has been increasingly considered. In the distributed telepresence system, an access node that is the closest to a user in terms of a hierarchy of the communication network processes the functions. Accordingly, it is possible to significantly reduce an increase and congestion of a media traffic load which are problems in the related art. However, due to the absence of the central server, there may be certain limitations of implementation of various functions. Therefore, these limitations may serve as constraints of enhancing reality and immersion of the telepresence system.

SUMMARY OF THE INVENTION

The present invention provides a method and device for determining a main speaker in a distributed telepresence service.

According to an aspect of the invention, there is provided a method of determining a main speaker that is performed by a first terminal participating in a distributed telepresence service. The method includes obtaining first feature information for determining a main speaker from an audio input signal, obtaining second feature information for determining a main speaker of a second terminal from the second terminal participating in the distributed telepresence service, and determining a main speaker terminal for providing a video and an audio of a main speaker who is participating in a telepresence and is speaking based on the first feature information for determining a main speaker and the second feature information for determining a main speaker.

The first feature information for determining a main speaker may be obtained based on a mean of likelihood ratios of audios and noises in the audio input signal.

The method may further include transmitting the first feature information for determining a main speaker to the second terminal.

The first feature information for determining a main speaker may further include at least one of a pitch, a pitch gain, a tone, and a change in energy of the audio input signal.

The method may further include obtaining an identifier of the main speaker terminal determined by the second terminal from the second terminal.

The identifier of the main speaker terminal determined by the second terminal and the second feature information for determining a main speaker may be received together with a video and an audio transmitted from the second terminal.

The method may further include requesting transmission of a high-definition video from the main speaker terminal, and displaying the high-definition video transmitted from the main speaker terminal in response to the request distinctively from videos received from terminals other than the main speaker terminal.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 5*a* and 5*b* are flowcharts illustrating a process of determining a main speaker from feature information for main speaker determination.

DETAILED DESCRIPTION OF EXEMPLARY EMBODIMENTS

Figure 1:
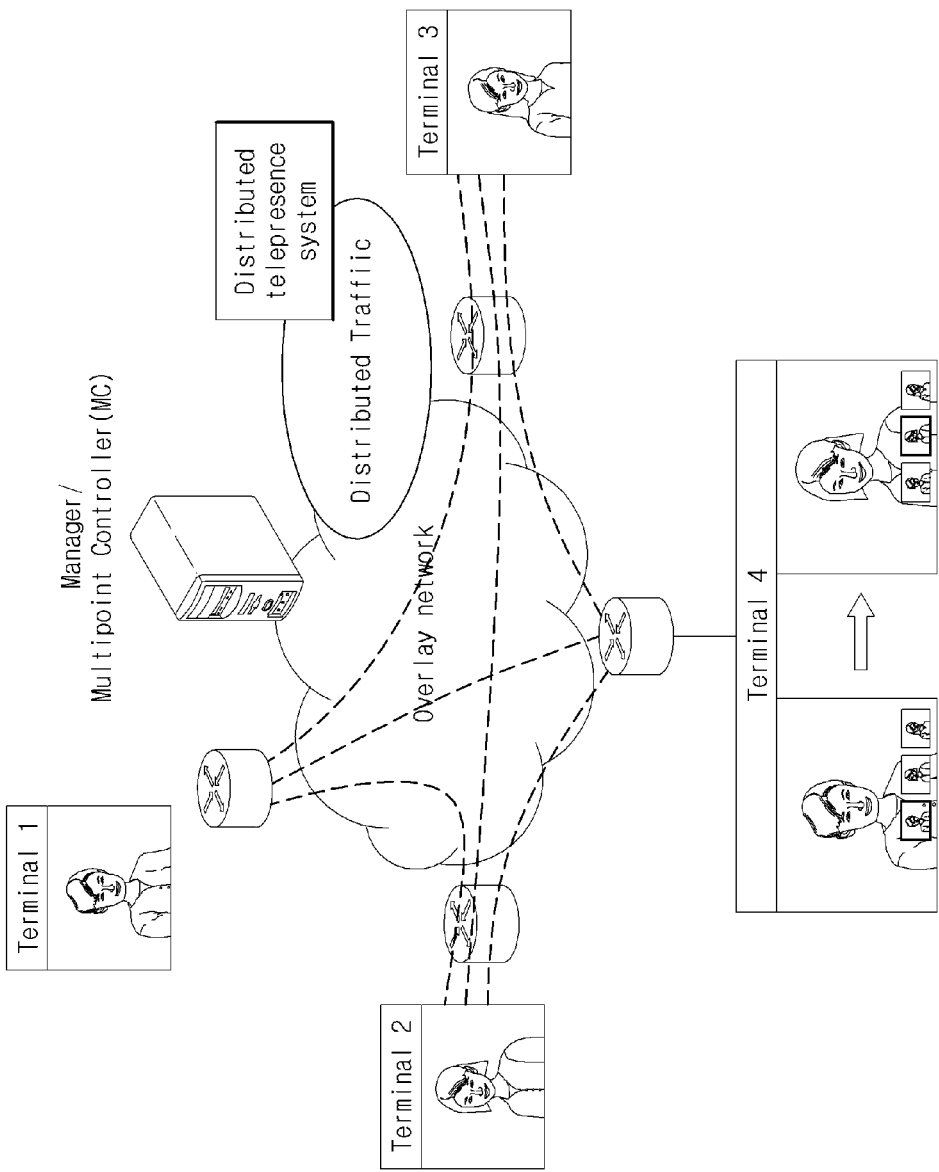
FIG. 1 is a diagram illustrating a configuration for determining a main speaker and screen switching in a distributed telepresence service according to an embodiment of the invention.

While the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

In description of the invention, when it is determined that detailed descriptions of related well-known technology may unnecessarily obscure the gist of the invention, detailed descriptions thereof will be omitted. The numbers (for example, first, and second) used in description of the specification are used only to distinguish one element from another.

In the specification, it will be understood that when an element is referred to as being "connected" or "coupled" to another element, it can be directly connected or coupled to the other element or intervening elements may be present unless the context clearly indicates otherwise.

Hereinafter, embodiments of the invention will be described in detail with reference to the accompanying drawings. In description of the invention, in order to facilitate overall understanding, like reference numerals are used for like elements even in different drawings.

FIG. 1 is a diagram illustrating a configuration of determining a main speaker and screen switching in a distributed telepresence service according to an embodiment of the invention.

In general, a telepresence service participant pays more attention to a main speaker who speaks at each individual time point. During speech, the main speaker may express his or her intention through facial expressions, gestures, or the like in addition to the speech transmitted as an audio signal. In addition, a variety of visual and auditory materials may also be provided. In order to provide a higher level of reality and enhance immersion for participants in a telepresence service, it is necessary to determine the main speaker at each time point and more effectively deliver a video and a sound which are provided from the determined main speaker.

In a centralized telepresence system, a communication node (for example, a communication node of a service management server) simultaneously accesses all media data, the main speaker is determined, and a video of the main speaker is transmitted to all participants. On the other hand, in the distributed telepresence system according to the embodiment of the invention, a call processing function and a media processing function, which are in charge of a management server of the centralized telepresence system, are distributed and processed over a communication network. In such a distributed structure, it is possible to reduce an increase and congestion of a media traffic load. On the other hand, since there is no central server such as a multipoint control unit (MCU) of the centralized telepresence system, it is difficult to apply an existing structure in which all media data is simultaneously accessed, the main speaker is determined, a high quality HD video is requested from the main speaker, and the video is transmitted to all participants.

FIG. 1 is a diagram illustrating an exemplary situation in which four terminals participate in the distributed telepresence service according to the embodiment of the invention. In the example of FIG. 1, terminals 1 to 4 may perform functions of transmitting a video and an audio of a user of each terminal to the other terminals who participate in the service, receiving a video and an audio of a user of a corresponding terminal from the other terminals, and providing the received video and audio to the user. Hereinafter, for convenience of description, description will be provided from the viewpoint of the terminal 4. In the example of FIG. 1, when the terminal 1 is a terminal that provides the video and the sound of the main speaker, the video provided from the terminal 1 may be provided through a main screen of the terminal 4 in the terminal 4.

In the example of FIG. 1, a case in which the video provided from the terminal of the main speaker is provided through an entire screen and screens provided from terminals of telepresence participants other than the main speaker are provided in parts of the screen as small screens is exemplified. However, the screen split ratio and the screen configuration in FIG. 1 are only an example for description. The screen configuration, arrangement of the video provided from each terminal, and the screen split ratio may be variously configured depending on embodiments.

It is preferable that the video provided to each terminal in the telepresence service be provided as a high-definition video for a higher level of reality and immersion. However, due to a limited network bandwidth and a limited number of displays of the user, it may be difficult to provide high-definition videos of all partners.

In the telepresence service according to the embodiment of the invention, image quality of the video provided to each participant terminal may be variously set depending on embodiments. However, due to the nature of the above telepresence system, the screen of the main speaker may be provided in higher definition than that of the other participants. That is, a method in which only the video of the main speaker is provided in high definition and the video of the other participants is provided in low definition may be applied.

In the telepresence service according to the embodiment of the invention, the main speaker may be determined in each participating terminal. Each participating terminal may request transmission of a high-definition video from the terminal for providing the video of the determined main speaker.

In the example of FIG. 1, since the terminal 1 provides the video and the sound of the main speaker, a high-definition video of the terminal 1 is displayed in a main screen (large screen) and low-definition videos provided from the other participating terminals are displayed in sub-screens (small screen) in a display unit of the terminal 4. Here, a difference of the image quality is relative, and the videos may be provided at the same image quality in different sizes according to the screen configuration in some embodiments. In the embodiment, the video of the main speaker in the main screen may be provided in the quality of high-definition video and the video of the sub-screen may be provided in a quarter common intermediate format (QCIF) video or a quarter video graphic array (QVGA) video.

In the embodiment, among videos of participants provided through the sub-screens, the video of the main speaker may be arranged or displayed (for example, being highlighted on the screen window) so as to be distinguished from the videos of the other participants.

In the example of FIG. 1, the terminal 4 simultaneously receives the high-definition video and the low-definition video from the terminal 1 that provides the video of the main speaker and receives low-definition videos from the terminal 2 and the terminal 3 which are the other participant terminals.

At this time, when a user of the terminal 2 starts to speak, that is, when the main speaker needs to be changed from the user of the terminal 1 to the user of the terminal 2, the telepresence system needs to determine the terminal 2 as the terminal from which the video of the main speaker is to be provided. In this condition, the centralized telepresence system may apply a method in which the central server such as the MCU or a conference bridge determines the terminal 2 as the terminal from which the video of the main speaker is to be provided and requests the high quality HD video from the terminal 2. However, as described above, since the distributed telepresence system has no central server, it is difficult to apply the same method as in the centralized telepresence system.

In the distributed telepresence system according to the embodiment of the invention, determination of the main speaker may be performed by each participating terminal. That is, the terminal 4 may determine the terminal 2 as the main speaker based on feature information for main speaker determination transmitted from the other participating terminals (terminals 1 to 3) and its own feature information for main speaker determination. A method of determining the main speaker based on the feature information for main speaker determination will be described in detail below.

The terminal 4 which has determined the main speaker requests transmission of the high-definition video from the terminal 2 through a protocol server and requests stopping of the high-definition video transmission from the terminal 1. The main screen showing in a display of the terminal 4 is automatically switched to a high-definition video that is newly received from the terminal 2. The low-definition videos of the partner terminals other than the terminal 2 are displayed in sub-screens. Since this automatic screen switching allows the viewers to focus on a person who is speaking, it is possible to enhance immersion of a video conference.

In another embodiment, in order to satisfy various user requirements, it is possible to select a high quality HD video of a participant in whom one has personal interest when the network bandwidth is available. For example, when the user of the terminal 4 wishes to see a high-definition video of the terminal 3 in which he or she is interested, the user selects the video of the terminal 3 in the sub-screen.

Figure 2:
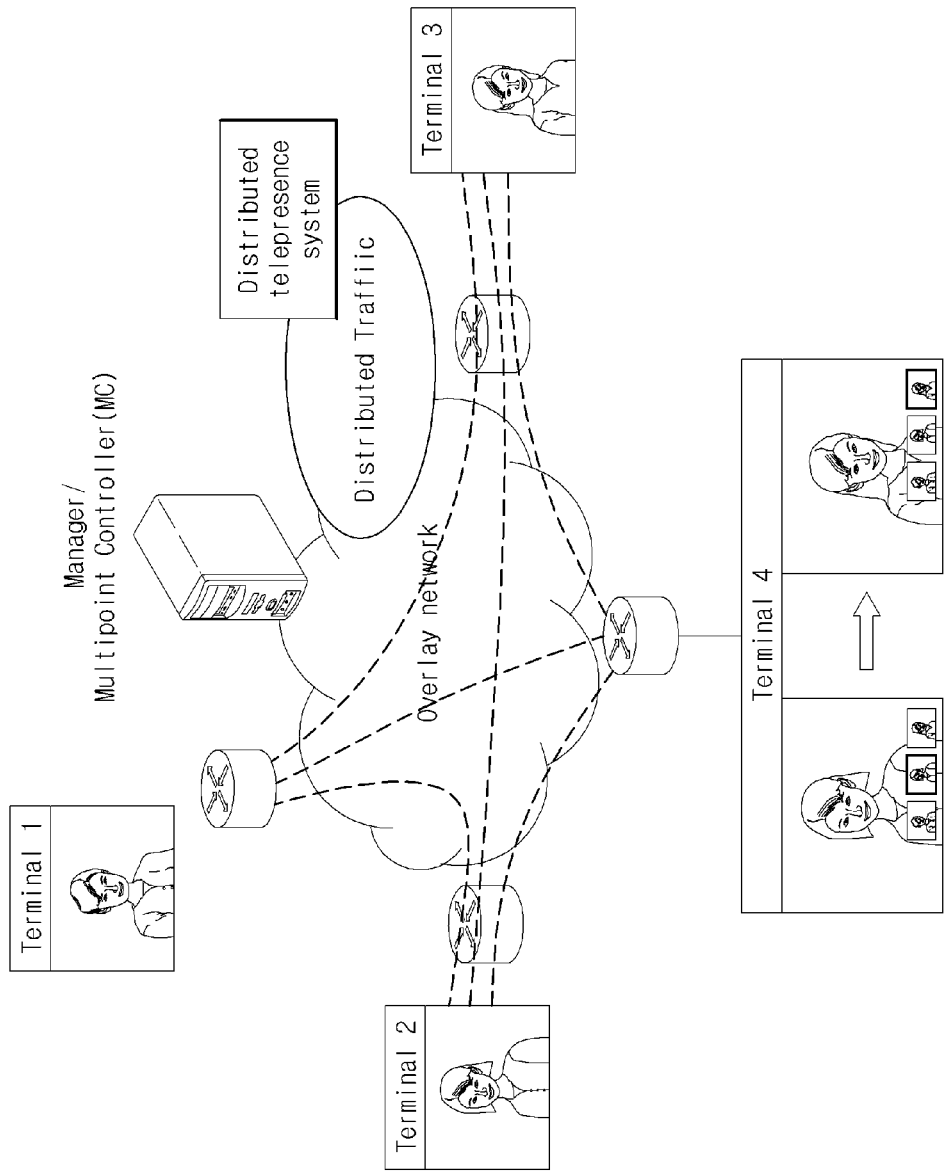
FIG. 2 is a diagram illustrating exemplary screen switching that is performed by selection of a participant.

When the user selects a video in a specific sub-screen, transmission of the high-definition video is requested from the terminal 3 through the protocol server as when the main speaker is automatically determined. The main screen is switched to the received high-definition video of the terminal 3 and the low-definition videos of the other terminals are displayed in the sub-screens. Although a participant other than the main speaker is displayed in the main screen, in an embodiment in which the video of the main speaker is distinctively displayed from videos showing in the sub-screen as the above-described embodiment, it is possible to recognize the main speaker who is currently speaking in the video conference even in a passive selection mode. FIG. 2 is a diagram illustrating exemplary screen switching that is performed by selection of the participant.

Since the participating terminal performs determination of the main speaker to be described in detail independently from automatic or passive selection of main screen setting while participating in the telepresence, when the passive mode is released, the main screen may be immediately switched to a high-definition video of the current main speaker. The screen setting by passive selection may further increase participation and satisfaction of the telepresence participant. This may be easily implemented by the embodiment of the invention in which the main speaker is determined by each terminal.

Figure 3:
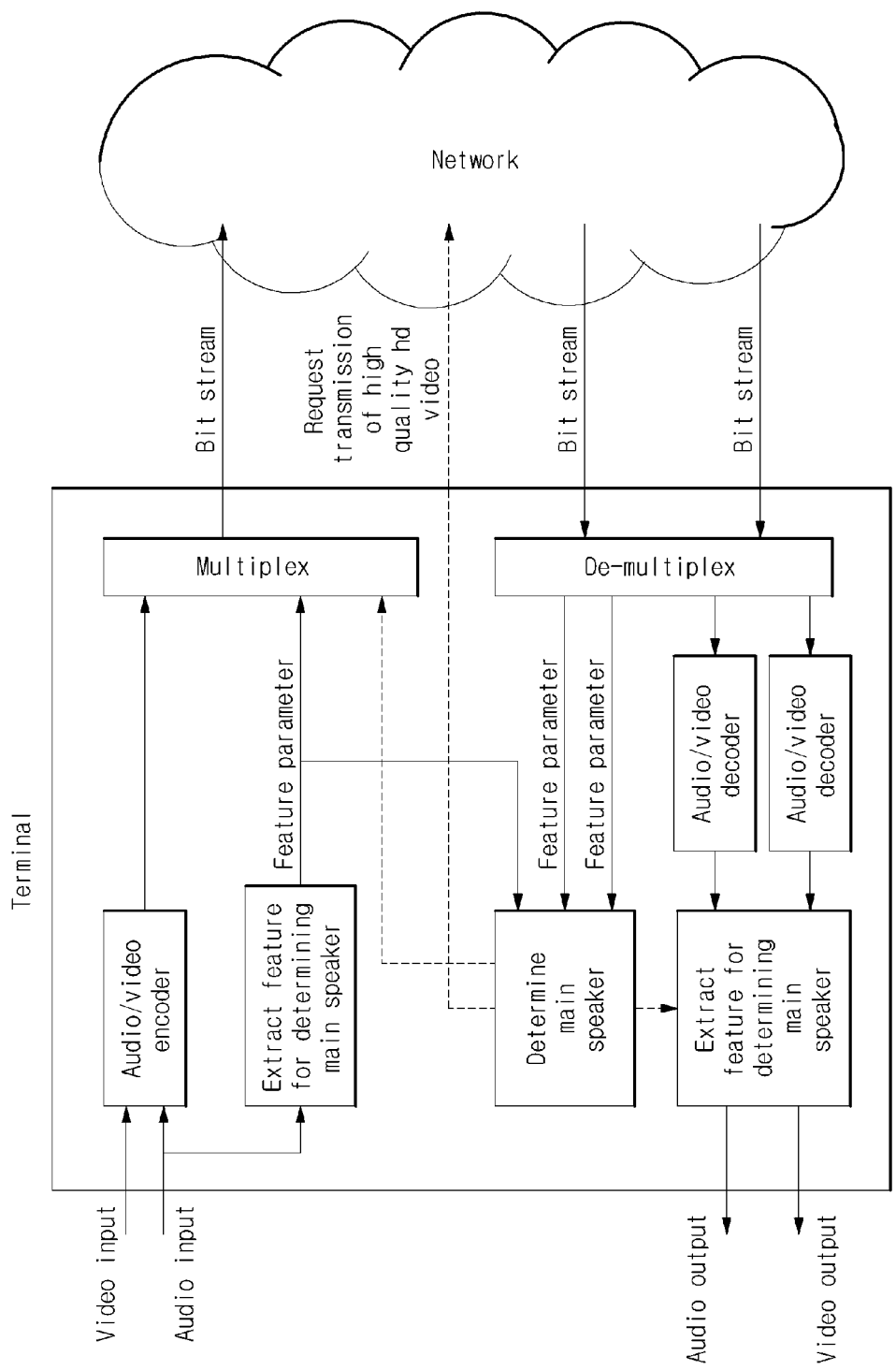
FIG. 3 is a block diagram illustrating a process of determining a main speaker according to an embodiment of the invention.
Figure 4:
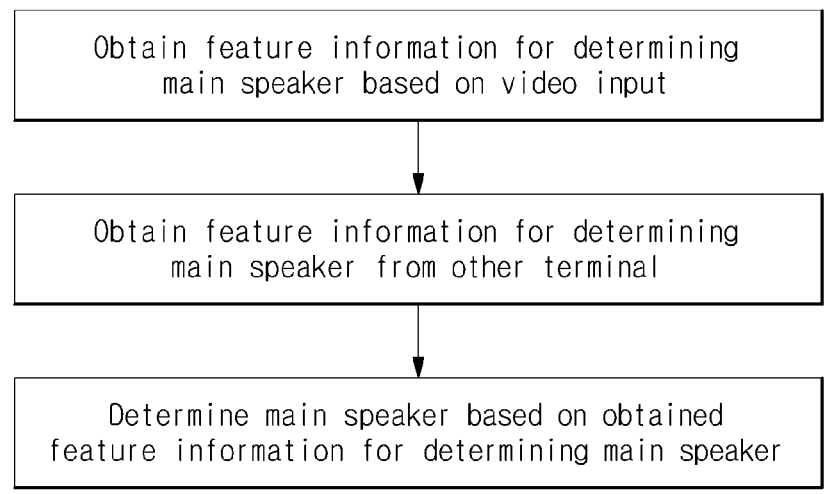
FIG. 4 is a flowchart illustrating a process of determining a main speaker according to an embodiment of the invention.

FIG. 3 is a block diagram illustrating a process of determining the main speaker according to the embodiment of the invention. FIG. 4 is a flowchart illustrating a process of determining.

The determining of the main speaker that is performed by the terminal according to the embodiment of the invention includes analyzing a microphone signal input from a user terminal, extracting and obtaining feature information for main speaker determination, obtaining feature information for main speaker determination from other participating terminals, and determining the main speaker based on the obtained feature information for main speaker determination.

In the embodiment, the feature information for main speaker determination that is used to determine the main speaker may be a log value of a geometric mean of likelihood ratios of an audio and noise (aver_likelihood). When it is assumed that an audio signal $\vec{s}(t)$ and a noise signal $\vec{N}(t)$ are added and input as an audio signal $\vec{X}(t)=[X_0(t),\ldots,X_{k-1}(t)]^T$, Formulae 1 show cases in which there is no audio in an input audio signal ($H_0$) and in which there is an audio in an input audio signal ($H_1$).

$$H_0: \vec{X}(t)=\vec{N}(t)$$

$$H_1: \vec{X}(t)=\vec{N}(t)+\vec{S}(t) \qquad \text{Formulae 1}$$

Here, when it is assumed that each frequency bin is independent, and the audio signal and the noise signal are independent and show a normal distribution with zero mean, a probability distribution of microphone signals (audio input signal) in a kth frequency bin may be as shown in Formulae 2.

Formulae 2

$$P(Xk(t) \mid H_0) = \frac{1}{\pi \lambda n, k} \exp\left[-\frac{|Xk(t)|^2}{\lambda n, k}\right]$$

$$P(Xk(t) \mid H_1) = \frac{1}{\pi(\lambda n, k + \lambda s, k)} \exp\left[-\frac{|Xk(t)|^2}{\lambda n, k + \lambda s, k}\right],$$

$$k = 0, \ldots K - 1$$

Here, K represents the number of frequency bins in total, and λn,k and λs,k represent variances of the audio signal and the noise signal in the kth frequency bin.

Here, a likelihood ratio $A_k(t)$ of the audio signal and the noise signal in the kth frequency bin is as shown in Formula 3.

$$\Lambda_k(t) \equiv \frac{P(Xk(t) \mid H_1)}{P(Xk(t) \mid H_0)} = \frac{1}{1+\xi_k} \exp\left[\frac{\gamma_k \xi_k}{1+\xi_k}\right], \qquad \text{Formula 3}$$

$$k = 0, \ldots, K - 1$$

Here, $$\xi_k = \frac{\lambda s, k}{\lambda n, k}$$

and $$\gamma_k = \frac{|Xk|^2}{\lambda n, k}$$

represent a priori SNR and a posteriori SNR.

As the feature information for main speaker determination, a log value of the geometric mean of likelihood ratios in each frequency bin may be used, which may be obtained as in Formula 4.

$$\text{aver\_liklihood} = \frac{1}{K}\sum_{k=0}^{K-1} \log\Lambda_k(t) \qquad \text{Formula 4}$$

In the above embodiment, it is assumed that the audio signal and the noise signal follow a normal distribution. However, depending on embodiments, a Laplacian or gamma distribution may be assumed and applied.

In another embodiment, in order to reduce computational complexity, as the feature information for main speaker determination, an arithmetic mean of sub-band SNRs (aver_snr) of Formula 5 may be used instead of the likelihood ratios.

$$\text{aver\_sur} = \frac{1}{L} \sum_{k=0}^{L-1} \frac{|X_k|^2}{\lambda_{n,k}(t)} \quad \text{Formula 5}$$

More specifically, the geometric mean of the likelihood ratios or the arithmetic mean of the sub-band SNRs may be represented by 16 bits and a variance value) (λn,k) of estimated noise signals may be represented by 16 bits. Depending on embodiments, the feature information for main speaker determination may further include additional information such as a pitch, a pitch gain, a tone, and a change in energy in addition to the above two pieces of information.

However, there may be a problem in that the network bandwidth used by the telepresence system significantly increases when different terminals are determined as a terminal for providing the video of the main speaker among terminals participating in the telepresence.

In the example of FIG. 1, the terminal 4 determines the terminal 2 as the main speaker based on the feature information for main speaker determination transmitted from the other participating terminals. By following the same process, the terminal 1, the terminal 2, and the terminal 3 also determine the main speaker. In this case, due to a network and terminal delay, occurrence of packet loss, asynchronous terminal, or the like, when different participants are selected as the main speaker in each participating terminal, a plurality of high-definition videos are transmitted and received in the telepresence system, and thus a required bandwidth increases. Accordingly, when the participating terminals determine different main speakers, it is necessary to quickly rectify the situation.

According to the embodiment of the invention, the participating terminal may transmit identification information of the main speaker it has selected to the other participating terminals. As a result, it is possible to address inconsistency of main speaker setting among participating terminals.

When the video conference starts in the telepresence service, the terminal participating in the conference is assigned a unique identifier and notifies other terminals of its own identifier information. In the embodiment, when a coded audio bit stream and the feature information for main speaker determination are transmitted to the other participating terminals, it is also possible to transmit an identifier of a terminal that is determined as the main speaker terminal. The feature information for main speaker determination and the identifier of the terminal may be transmitted through a real time protocol (RTP) packet.

The participating terminals that have received the identifier (identification information) of the terminal that is determined as the main speaker terminal compare the terminal that is determined as the main speaker terminal by the participating terminals and the main speaker terminal received from the other terminals. When 70% or more of total terminals have selected the same main speaker, it is possible to change main speaker terminal determination based on the result. In this embodiment, even when the feature information for main speaker determination is not received due to loss of some packets, it is possible to correctly determine the main speaker.

More specifically, it is assumed and described that the maximum number of participants in the telepresence is set to 32 and an identifier of a previous main speaker is represented by 6 bits. A total of 38 bits including the feature information for main speaker determination of 32 bits and the previous main speaker identifier of 6 bits are multiplexed with the audio bit stream. As described above, when not all participating terminals select the same main speaker, a bandwidth required for the service increases. Therefore, before the video conference starts, it is necessary to perform time synchronization between the terminals in advance. In order to synchronize, a network time protocol (NTP) which is widely used to synchronize time between computers over the Internet may be used.

When the terminal participates in the conference, the terminal requests exchange of an accurate current time from an NTP server. A 64-bit NTP timestamp is composed of 32 bits for seconds and 32 bits for fractional seconds.

The terminal calculates a time difference between the terminal and the server through the exchange of the current time and estimates a connection delay time. It is possible to adjust and match a time of the terminal with a time of the server through estimation of the connection delay time.

After the video conference starts, the terminal may perform synchronization between terminals through time synchronization with the NTP server at a predetermined interval. After synchronized time information is used in a 32 bit timestamp in an RTP header, the terminal may transmit multiplexed information included in an RTP payload to partner terminals.

Data in the payload of a received RTP packet is de-multiplexed into an audio codec, the identifier of the main speaker terminal, and the feature information for main speaker determination, and timestamp information in the RTP header is stored. The terminal uses feature information having the same timestamp and determines the main speaker. Here, since the main speaker of all participants in the telepresence is determined, the feature information of the present terminal is also required in addition to the received feature information.

In the embodiment, a weight is assigned to the main speaker, an audio signal of the main speaker is mixed, and thus it is possible to provide a higher level of immersion. When a current main speaker channel is the same as a previous main speaker channel, a weight may be assigned to a received audio signal audio$_i$(j) as in the following Formula 6. A new audio signal of the main speaker in which the weight is reflected may be as shown in Formula 6.

$$\text{new\_audio}(j) = \frac{1}{M+\alpha} \left[ \sum_{i=1, i \neq main\_idx}^{M} \text{audio}_i(j) + (1+\alpha) \times \text{audio}_{main\_idx}(j) \right] \quad \text{Formula 6}$$

for $j = 1, \ldots, N$

Here, M represents the number of participants in the telepresence, N represents a frame size, and α represents a weight factor.

In this case, a tic noise may occur due to a sudden energy level change caused by the change of the main speaker. In the embodiment, in order to prevent such a tic noise from occurring, it is possible to add a smoothing effect. Formula 7 shows an audio signal of the main speaker to which the smoothing effect is added.

$$\text{new\_audio}(j) = \qquad \text{Formula 7}$$

$$\frac{1}{M+a} \left[ \sum_{\substack{i-1 i \neq main\_idx \\ and\ prev\_main\_idx}}^{M} \text{audio}_j(j) + \left(1 + \alpha \frac{j}{N}\right) \times \right.$$
$$\left. \text{audio}_{main\_idx}(j)\left(1 + \alpha\left(1 - \frac{j}{N}\right)\right) \times \right.$$
$$\left. \text{audio}_{prev\_main\_idx}(j) \right]$$

$$\text{for } j = 1, \ldots, N$$

Figure 5B:
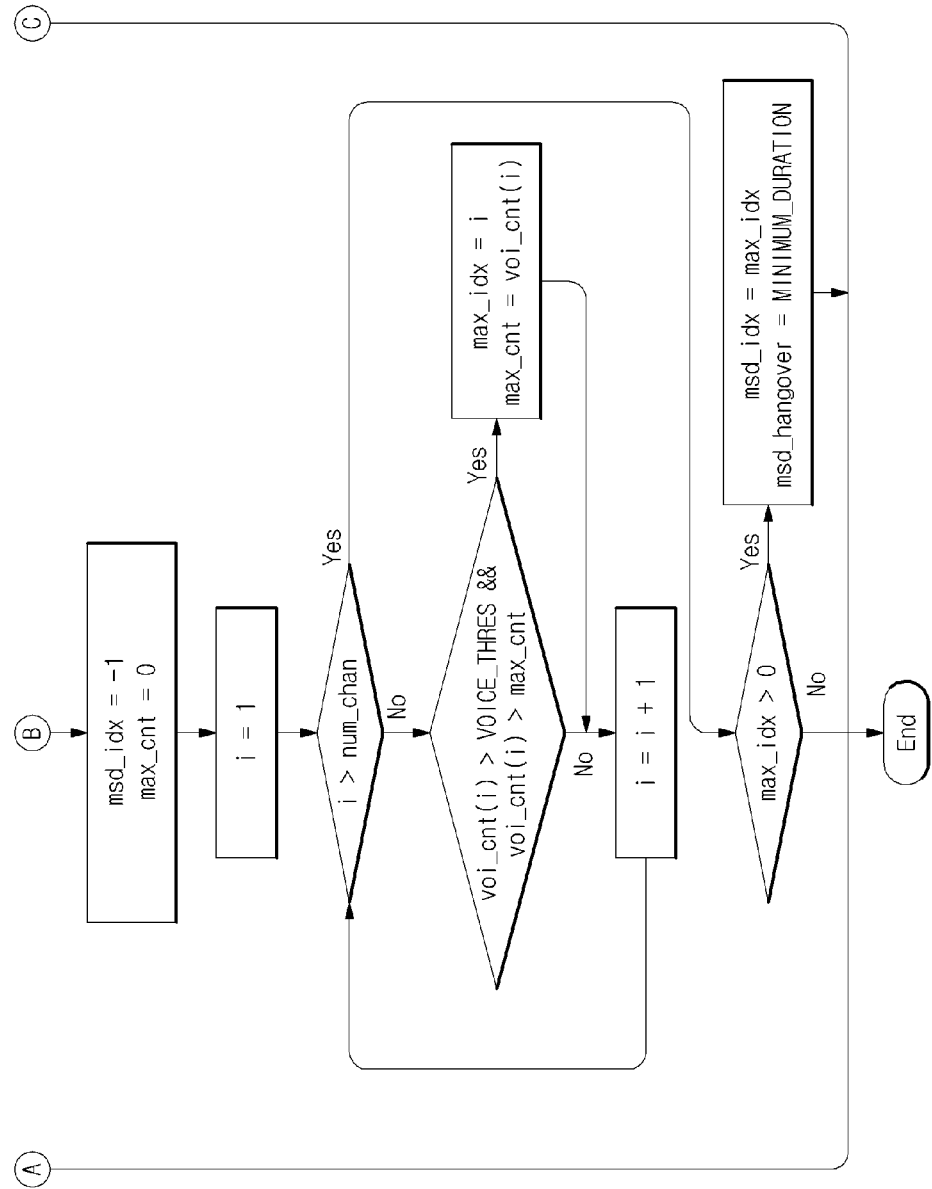

FIGS. 5a and 5b are flowcharts illustrating a process of determining the main speaker from the feature information for main speaker determination.

The process of FIG. 5 may be performed in a block of determining the main speaker of FIG. 3.

Audio activation of each terminal is detected from the feature information for main speaker determination (as described above, including the geometric mean of likelihood ratios, the arithmetic mean of sub-band SNRs, or energy of the noise depending on embodiments) as shown in Formulae 8.

$$\text{aver\_liklihood} = \frac{1}{K}\sum_{k=0}^{K-1} \log \Lambda_k(t) \overset{H_1}{\underset{H_0}{\gtrless}} \eta \qquad \text{Formulae 8}$$

$$\text{aver\_snr} = \frac{1}{L}\sum_{k=0}^{L-1} \frac{|X_k|^2}{\lambda_{n,k}(t-1)} \overset{H_1}{\underset{H_0}{\gtrless}} \beta$$

Here, thresholds η and β may be obtained from the energy of the noise. As the energy of the noise increases, the threshold may also increase. The terminal for determining the main speaker may determine that the audio is activated when the feature information for main speaker determination (the geometric mean of likelihood ratios or the arithmetic mean of sub-band SNRs) is greater than the threshold, or that the audio is inactivated when the feature information for main speaker determination (the geometric mean of likelihood ratios or the arithmetic mean of sub-band SNRs) is less than the threshold.

After it is detected whether the audio is activated from the feature information for main speaker determination, the number of consecutive audios (voi_cnt) and the number of consecutive silent letters (sil_cnt) of each partner terminal are calculated, and an initial main speaker (msd_idx) is determined based on the calculation result.

In this case, incorrect detection of audio activation and unnecessary detection of audio activation may occur. For example, a section of three frames or more in a section of a babble noise or a music noise may be incorrectly determined as an audio, or the main speaker may not be determined in a section in which a very short and meaningless sound such as "yes" or "umm" occurs.

In order to correct these errors, a minimum length of utterances (VOICE_THRES) may be set in the embodiment of the invention. When a length of utterances of the user is less than the minimum length of utterances, the terminal may not be selected as a new main speaker.

In addition, users may become tired and lose focus due to excessively frequent changes of the main speaker and the high-definition video. In another embodiment, when a new main speaker screen is selected, the terminal may prevent the main speaker from being changed to another main speaker for a minimum time (MINIMUM_DURATION). In addition, a minimum rest period (PAUSE_THRES) may be set such that screen switching due to the change of the determined main speaker to another main speaker does not occur in the middle of speaking. That is, a process of determining the new main speaker may be performed only when the number of silent letters is greater than the minimum rest period.

In the embodiment, when a conference participant who is currently speaking is determined, a priority may be given to a person who speaks first when there are two or more speakers. That is, when there is no person who is currently speaking, main speaker determination of the previous frame is maintained. When a connection of the partner terminal is terminated midway, the number of consecutive audios and the number of consecutive silent letters are set to 0. As described above, a process in which the determined initial main speaker is compared with information on the main speaker received from the other terminals and is corrected may be performed.

The method of determining the main speaker may be implemented as a module (such as a process or a function) for performing the above function. The module may be stored in a memory and executed by a processor. The memory may be provided in the inside or the outside of the processor, and may be connected to the processor using a well-known method.

The terminal may include a processor that is set to execute the method of determining the main speaker. The processor may include an application specific integrated circuit (ASIC), another chipset, a logic circuit and/or a data processing device. The memory may include a read only memory (ROM), a random access memory (RAM), a flash memory, a memory card, a storage medium and/or another storage device.

In the distributed telepresence service according to embodiments of the invention and combinations thereof, it is possible to significantly reduce an increase and congestion of a media traffic load compared to the centralized telepresence. In addition, a method of determining a main speaker who is currently speaking in the distributed telepresence service is provided so that a screen of a participant terminal is adaptively switched according to a change of the main speaker. Therefore, it is possible to improve convenience of the participant and increase immersion in the video conference. In the additional embodiment, it is possible to further increase immersion through processing of the audio signal of the main speaker.

It is possible to provide seamless videos and sounds to the participant using a relatively narrow bandwidth and the telepresence service for more users using a limited bandwidth.

The above-described embodiments include various aspects of examples. Although not all possible combinations for showing various aspects can be described, those skilled in the art may recognize other possible combinations. Therefore, the present invention encompasses all changes, modifications, and alternations fall within the scope of the appended claims.

What is claimed is:

1. A method of determining a main speaker terminal that is performed by a first terminal participating in a distributed telepresence service, the method comprising:
   obtaining first feature information for determining a main speaker terminal of which a main speaker is participating in the distributed telepresence service and is speaking from an audio input signal that is generated in the first terminal;
   receiving second feature information for determining the main speaker terminal from a second terminal participating in the distributed telepresence service; and
   determining the main speaker terminal for providing a video and an audio of the main speaker based on the first feature information and the second feature information,
   wherein the main speaker terminal is the first terminal or the second terminal.

2. The method of claim 1, further comprising transmitting the first feature information to the second terminal.

3. The method of claim 1, wherein the first feature information is obtained based on a mean of likelihood ratios of audios and noises in the audio input signal.

4. The method of claim 3, wherein the first feature information further includes energy of noise, and the determining of the main speaker terminal includes comparing the mean of likelihood ratios and a threshold calculated from the energy of the noise, and determining whether audios of the first terminal and the second terminal are activated.

5. The method of claim 4, wherein the determining of the main speaker terminal includes calculating of the number of consecutive audios and the number of consecutive silent letters of the first terminal and the second terminal based on the determination of whether audios of the first terminal and the second terminal are activated.

6. The method of claim 5, wherein, in the determining of the main speaker terminal, when the number of consecutive silent letters of the main speaker terminal is greater than a pre-set minimum number of silent letters, a terminal in which the number of consecutive audios of the first terminal and the second terminal is greater than a pre-set minimum number of consecutive audios is selected as a new main speaker terminal.

7. The method of claim 6, wherein, in the determining of the main speaker terminal, when there are a plurality of terminals in which the number of consecutive audios of the first terminal and the second terminal is greater than a pre-set minimum number of consecutive audios, a terminal having the greatest number of consecutive audios is selected as the new main speaker terminal.

8. The method of claim 7, wherein the determining of the main speaker terminal includes disabling a change of the main speaker terminal for a pre-set minimum time.

9. The method of claim 3, wherein the first feature information further includes at least one of a pitch, a pitch gain, a tone, and a change in energy of the audio input signal.

10. The method of claim 1, further comprising obtaining an identifier of a terminal determined as the main speaker terminal by the second terminal.

11. The method of claim 10, wherein the identifier of the terminal determined as the main speaker terminal by the second terminal and the second feature information are received together with a video and an audio transmitted from the second terminal.

12. The method of claim 10, wherein the identifier of the terminal determined as the main speaker terminal by the second terminal and an identifier of a terminal determined as the main speaker terminal by the first terminal are compared to change the main speaker terminal.

13. The method of claim 1, further comprising:
   synchronizing, by the first terminal and the second terminal, a time when accessing a distributed telepresence conference; and
   transmitting a time at which the audio input signal is generated to the second terminal.

14. The method of claim 13, wherein the main speaker terminal is determined based on the first feature information and the second feature information which have the same time.

15. The method of claim 1, further comprising:
   requesting transmission of a high-definition video from the main speaker terminal; and
   displaying the high-definition video transmitted from the main speaker terminal in response to the request distinctively from videos received from terminals other than the main speaker terminal.

16. A first terminal which provides a distributed telepresence service, the terminal comprising:
   a processor configured to obtain first feature information for determining a main speaker terminal of which a main speaker is participating in the distributed telepresence service and is speaking from an audio input signal that is generated in the first terminal, receive second feature information for determining the main speaker terminal from a second terminal participating in the distributed telepresence service, and determine the main speaker terminal for providing a video and an audio of the main speaker based on the first feature information and the second feature information, wherein the main speaker terminal is the first terminal or the second terminal.

17. The terminal of claim 16, wherein the first feature information is obtained based on a mean of likelihood ratios of audios and noises in the audio input signal.

* * * * *